US005567863A

United States Patent [19]

Larson et al.

[11] Patent Number: 5,567,863

[45] Date of Patent: Oct. 22, 1996

[54] INTENSITY ACOUSTIC CALIBRATOR

[75] Inventors: Brian G. Larson; Larry J. Davis, both of Provo, Utah

[73] Assignee: Larson-Davis, Inc., Provo, Utah

[21] Appl. No.: 440,640

[22] Filed: May 15, 1995

[51] Int. Cl.[6] .................................................. G01L 27/00

[52] U.S. Cl. .................................................. 73/1 D; 367/13

[58] Field of Search .................................. 73/1 D, 1 DV, 73/4 R; 367/13; 381/58

[56] References Cited

U.S. PATENT DOCUMENTS

| | | | |
|---|---|---|---|
| 3,659,255 | 4/1972 | Trott . | |
| 3,828,282 | 8/1974 | Endersz . | |
| 4,039,767 | 8/1977 | Leschek . | |
| 4,205,394 | 5/1980 | Pickens | 367/13 |
| 4,506,539 | 3/1985 | Hessler | 73/4 R |
| 4,715,219 | 12/1987 | Frederiksen . | |
| 5,029,477 | 7/1991 | Bambara . | |
| 5,210,718 | 5/1993 | Bjelland et al. . | |
| 5,251,469 | 10/1993 | Chan . | |

*Primary Examiner*—Robert Raevis
*Attorney, Agent, or Firm*—Thorpe, North & Western

[57] ABSTRACT

An intensity acoustic calibrator is disclosed including at least two wave guide channels. A speaker adjacent each wave guide channel emits sound to develop a standing wave pattern at the opposing end of the channel. The test microphone is positioned in the calibrator so as to be in acoustic communication with the wave guide channel so that the microphone can be calibrated respective to the standing wave pattern. By having two separate wave guide channels and speakers, the test microphones can be subjected to arbitrary magnitude changes and phase differentials. Additionally, a reference microphone may be positioned adjacent each wave guide channel to monitor the sounds generated by the speakers to ensure that the speakers are emitting sounds at the desired magnitude, phase, etc.

27 Claims, 6 Drawing Sheets

INTENSITY ACOUSTIC CALIBRATOR

BACKGROUND OF THE INVENTION

The present invention relates to a device for detecting and measuring sound through various media such as walls, car doors and the like, and in particular, to an improved intensity acoustic calibrator.

The use of microphones to detect and measure sound through various media is well known in many arts. Sound detecting and measuring can be used for such varied applications as the detection of flaws in buildings which allow sound to pass between rooms, and the amount of noise leaking through a sound barrier designed to shield residential areas from major highways.

Typically, the sound monitoring device will have two or more microphones which help the user to determine intensity and location of sound. Thus, the user is able to locate sound leaks and take corrective measures if necessary.

In order for the sound monitoring devices to be accurate, the microphones must be periodically calibrated to ensure that they are taking accurate measurements. In the past, this calibration was typically performed in a laboratory. The microphones to be calibrated were placed in a sound cavity, as shown in FIG. 1A and then adjustments were made to calibrate the microphones. This device 10 comprises an elongate tube 14 with an open first end 18 and a pair of microphone holes 22 and 26 at an opposing second end 30. The diameter of the tube is typically about 1.5 inches. In order to conduct a residual intensity test, speaker 32 emits a sound into the tube 14 and a first microphone 34 is tested, followed by a second microphone 38. The positions of the two are then switched and the test repeated. The average of the two tests provides an idea of the phase differential. However, as has been appreciated by those skilled in the art, with this device 10 attenuation of the transverse wave often showed up as phase differential, decreasing the reliability of the test.

Additionally, this method of calibration had other significant drawbacks which inhibit the reliability of the readings obtained by these microphones. The monitoring devices are rarely used in the laboratory. Rather, they are typically used at varied environments and locations. Because temperature, humidity and other environmental factors have a significant impact on the microphones, a pair of microphones which may have been properly calibrated in a laboratory may not be accurately calibrated for a cold, humid environment, such as on a boat, etc. The length of time since the last calibration is also significant: the longer the period of time since the last calibration, the less reliable the results.

In an attempt to resolve these concerns, a device 50 was developed to enable field testing. A simplistic representation of the device 50 is shown in FIG. 1B. The device 50 includes a pair of sound chambers 54 and 58 with an acoustic resistance 62 therebetween. A speaker 66 is placed in one of the chambers, and a microphone 70 and 74 is placed in each chamber. With such a device, the phase differential may be more accurately determined.

Unfortunately, the device generally only works to about 1 kHz, as the frequency is limited by the geometry. New standards adopted by many countries now require testing devices to be calibrated between 63 Hz and 6.3 kHz (ISO 1045). Because the devices currently available are not capable of testing microphones through such a range, it is common to use the electrostatic actuator test. In this test, a high voltage A/C signal (i.e. 800 V) is used to simulate an acoustic signal.

In light of the above, there is a need for an apparatus and method which enables the in situ acoustic calibration of microphones. Such a system will enable calibration under the varying environmental conditions which will be present during actual use of the microphones, and will prevent a significant time lag between the time at which the microphones were calibrated, and the time at which they are used. Such a system will also enable testing through the entire range required by ISO 1043 and related world standards.

SUMMARY OF THE INVENTION

It is an object of the present invention to provide an intensity acoustic calibrator which enables the calibration of microphones in situ.

It is another object of the present invention to provide a method for calibrating microphones under a variety of differing environmental conditions.

It is another object of the present invention to provide an intensity acoustic calibrator which can test each microphone independently and in combination.

It is another object of the present invention to provide an intensity acoustic calibrator which can test two or more microphones to ensure that they are properly calibrated.

It is yet another object of the present invention to provide an intensity acoustic calibrator which can test microphones from 63 Hz to in excess of 6.3 kHz.

It is still another object of the invention to calibrate microphones directly in units of intensity.

It is a further object of the invention to improve the fundamental accuracy of intensity calibration.

It is still another object of the invention to simplify the procedure for performing intensity calibrations.

The above and other objects of the invention are realized in specific illustrated embodiments of an intensity acoustic calibrator including a wave guide having a pair of guide channels formed therein and a receptacle along each guide channel for holding a microphone to be tested. Each guide channel is designed so that a known test sound develops a standing wave pattern in the wave guide. The microphones to be tested may then be calibrated under environmentally accurate conditions.

In accordance with another aspect of the invention, a highly stable reference microphone is placed along each wave guide channel. The reference microphone provides a back-up system for ensuring that the microphones being tested provide accurate readings and are calibrated properly, and that the speakers or other acoustical transmitters used to develop intensity and phase differential at varying frequencies are operating properly.

In accordance with another aspect of the invention, one or more acoustic transmitters, such as a speaker, is disposed in the calibrator for developing a standing wave pattern in the wave guide. The acoustic transmitter, of course, may be other types of transmitters than speakers. For example, the transmitter could use, air modulators, or could use electrostatic, piezoelectric, mechanical, electromagnetic, or other principles to generate the desired waves.

In accordance with yet another aspect of the present invention, each acoustic transmitter is connected to a control device and is in a closed loop with the reference microphones so as to continuously monitor the output of the acoustic transmitter.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1A:
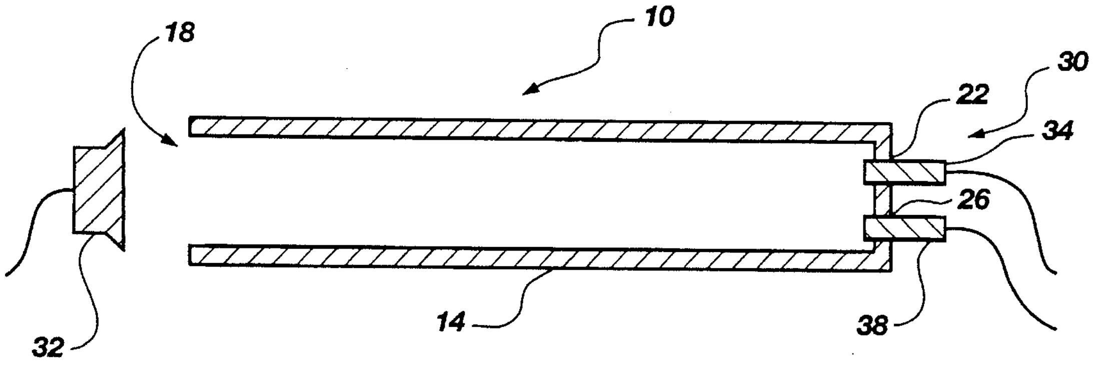
Fig. 1a (PRIOR ART)
FIG. 1A is a side cross-sectional view of a calibrator of the prior art.
Figure 1B:
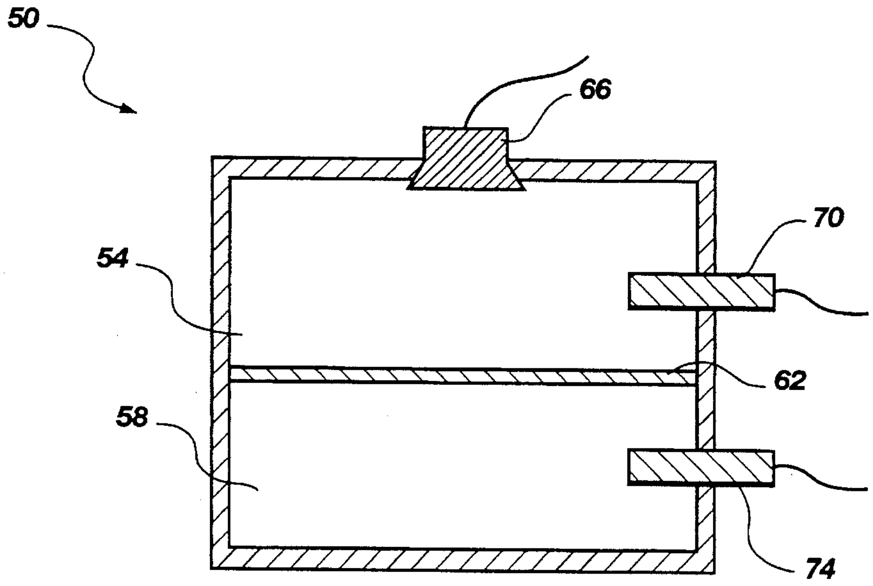
Fig. 1b (PRIOR ART)
FIG. 1B is a side cross-sectional view of another calibrator of the prior art.
Figure 2:
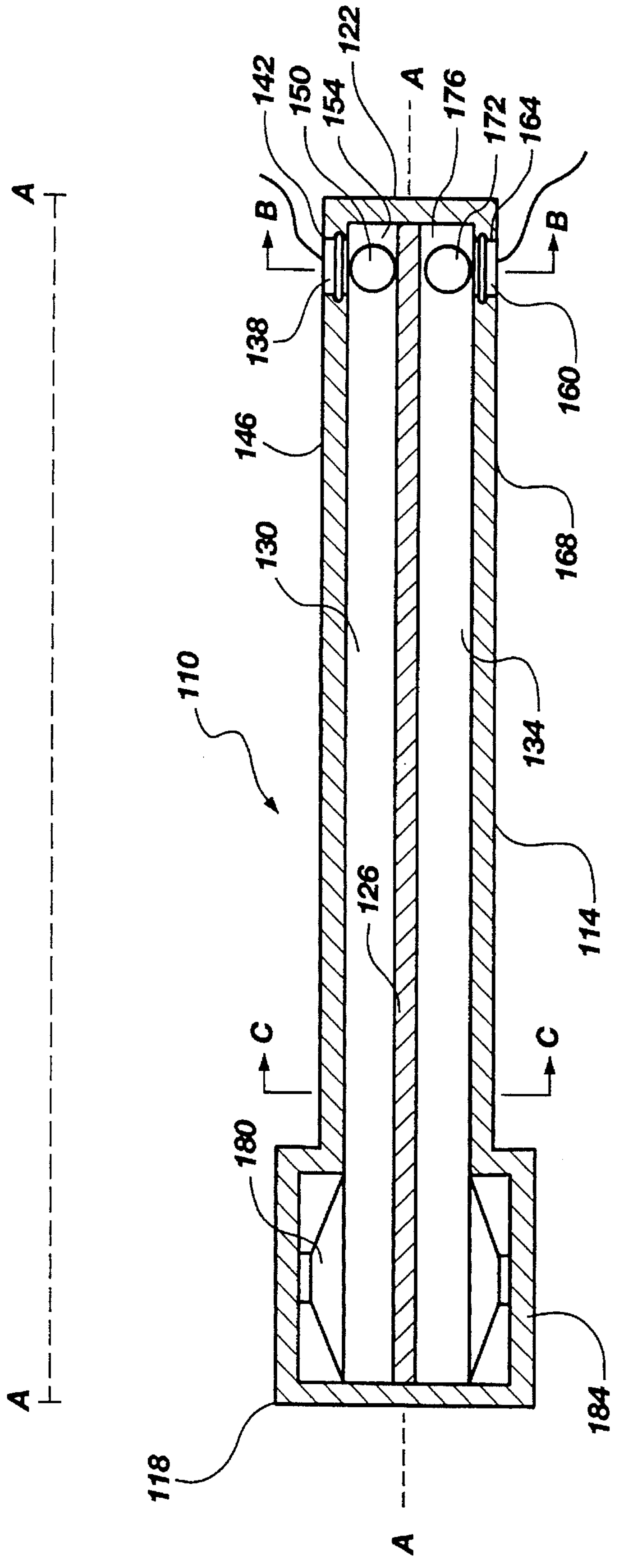
FIG. 2 is a bottom cross-sectional view of an intensity acoustic calibrator made in accordance with the principles of the present invention.

Reference will now be made to the drawings in which the various elements of the present invention will be given numeral designations and in which the invention will be discussed so as to enable one skilled in the art to make and use the invention. Referring to FIG. 2, there is shown a cross-sectional view of an intensity acoustic calibrator, generally indicated at 110. The calibrator 110 includes a generally hollow housing 114 with a closed first end 118 and a closed second end 122. The housing 114 is typically made of metal, such as steel, but could be made from other materials. A dividing wall 126 extends through the housing 114 so as to divide the housing along its long axis A—A. Thus, the dividing wall 126 forms two wave guide channels 130 and 134, respectively. Each of the wave guide channels 130 and 134 extends the length of the housing 114 and allows for accurate calibration of microphones up to at least 6.3 kHz.

Positioned near the second end 122 of the housing 114 in each wave guide channel 130 and 134 are a pair of microphones. In FIG. 2, the wave guide channel 130 has a test microphone 138 which nests in a receptacle 142 in a lateral sidewall 146 of the housing 114. Adjacent the test microphone 138 is a reference microphone 150 which is positioned in the top sidewall 154 surrounding the channel 130.

In the adjacent wave guide channel 134, another test microphone 160 is nestable in a receptacle 164 in a lateral sidewall 168 of the housing 114. Adjacent the test microphone 160 is a reference microphone 172 positioned in the top sidewall 176 defining the channel 134.

The test microphones 138 and 160 are microphones which are used on a measuring device as discussed in the background section. Prior to the present invention, the test microphones 138 and 160 would have been calibrated by one of the previously discussed methods, and their reliability would necessarily be limited to the accuracy of those calibration methods. However, by using the intensity acoustic calibrator 110 shown in FIG. 2, the test microphones 138 and 160 can be calibrated in the field under the same environmental conditions which they will be exposed to when used by the monitor, and can be calibrated between 63 Hz and 6.3 kHz without relying on electrostatic testing.

In practice, the test microphones 138 and 160 are inserted into the respective receptacles 142 and 164 in the sidewalls 146 and 168 of the housing. One or more acoustic transmitters, such as speakers 180 and 184, respectively, are positioned so that as to develop a standing wave pattern in each wave guide channel 130 and 134 adjacent to the first end.

While shown as two separate speakers in FIG. 2, a single acoustic transmitter could be used by removing part of the dividing wall 126 and positioning the acoustic transmitter so that it can generate a standing wave pattern in each of the wave guide channels 130 and 134. Of course, more than two wave guide channels could be used in such an arrangement.

Other types of acoustic transmitters also can be used. For example, an air modulator could be used in place of speakers 180 and 194. Other acoustic transmitters which are available and which will be apparent to those skilled in the art in light of this disclosure include those operating on electrostatic, electromagnetic, piezoelectric and mechanical principles.

The speakers 180 and 184 (or other acoustic transmitters) generate sound which travels down the wave guides 130 and 134 and develops a standing wave pattern adjacent the microphones 138, 150, 160 and 172. The speakers 180 and 184 can be varied to develop arbitrary intensity fields and to modify the phase differential received by the microphones 138, 150, 160 and 172. As the test microphones 138 and 160 are being tested, the reference microphones 150 and 172 are used to ensure the user that the speakers 180 and 184 are performing as desired, i.e. whether the speakers are actually emitting the predetermined sound intensity, frequency, etc. selected by the user. If the speakers 180 and 184, or any other acoustic transmitter, are not monitored in such a way, a malfunction could result in a calibration which actually increases any errors. Additionally, with the present invention, each test microphone 138 and 160 can be tested individually and in tandem by digitally controlling the speakers 180 and 184, and confirming the speakers' output with the reference microphones 150 and 172.

Figure 3:
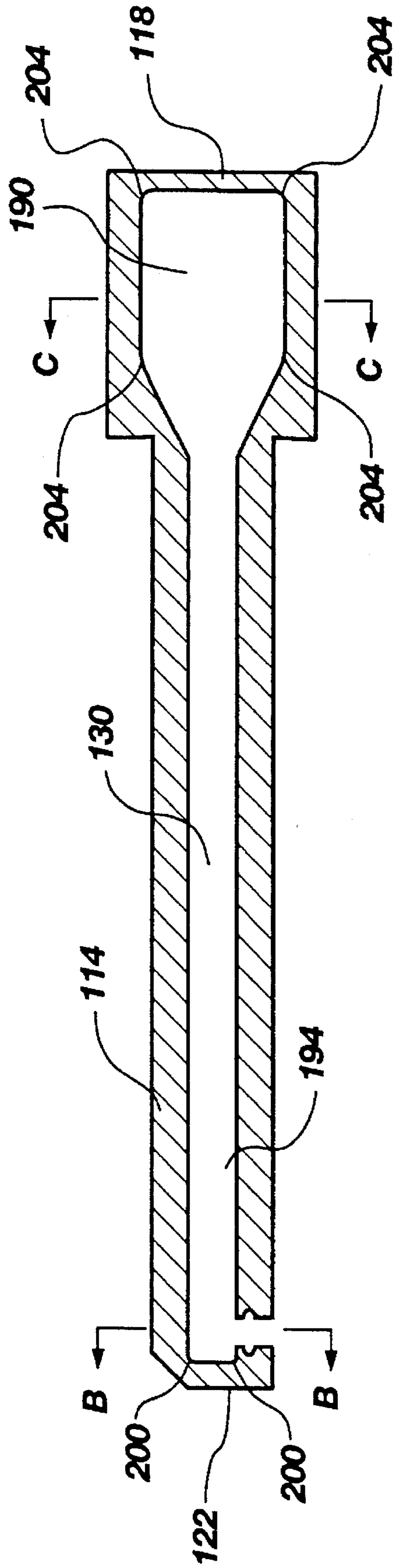
FIG. 3 is a side cross-sectional view of an intensity acoustic calibrator taken through one of the wave guide channels.
Figure 4A:
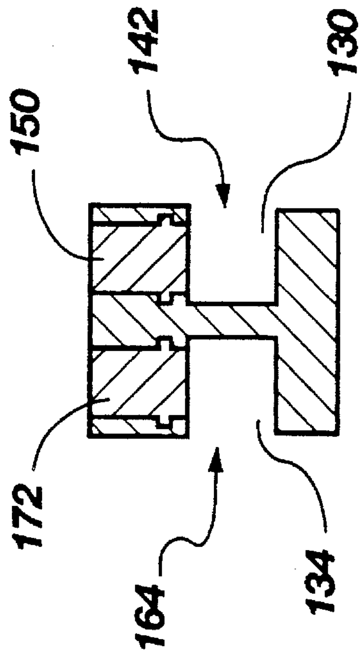
FIG. 4A is a cross-sectional view of the intensity acoustic calibrator as shown in FIG. 2, taken along the plane B.
Figure 4B:
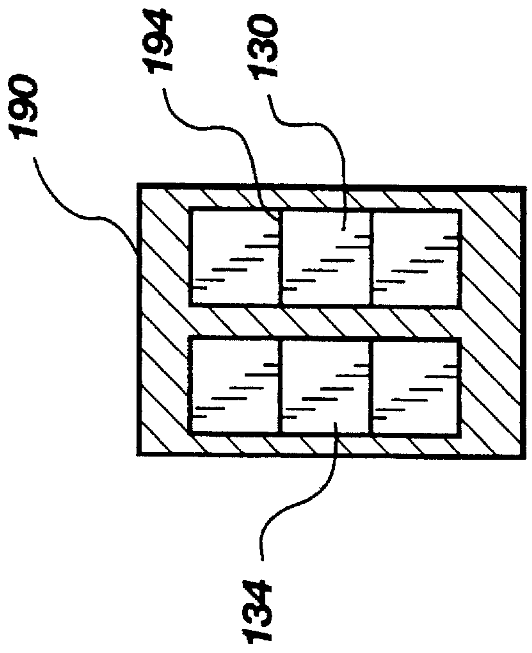
FIG. 4B is a cross-sectional view of the intensity acoustic calibrator as shown in FIG. 2, taken along the plane C.

Referring now to FIG. 3, there is shown a side cross-sectional view taken through the wave guide channel 130, along the long axis of the housing 114. Adjacent the first end 118, the wave guide channel 130 has a larger portion 190, meaning a portion having a larger cross-sectional area, and a smaller portion 194, meaning a portion having a smaller cross-sectional area. A cross-section of each portion is shown in FIGS. 4A and 4B. Typically, the width of the wave guide channel 130 will remain the same for its entire length. Thus, in a preferred embodiment, for example, the wave guide channel 130 along the larger portion 190 adjacent the first end 118 is 0.375 inches wide and 1.1 inches tall, giving a cross-sectional area of 0.413 square inches. The channel 130 then slopes so as to have a generally square cross-section of 0.375 inches by 0.375 inches through the smaller portion 194, giving a cross-sectional area of 0.141 inches. In this embodiment, the smaller portion 194 of the wave guide channel 130 will typically be about 6.75 inches long, while the larger portion 190 of the wave guide channel 130 will be about 2 inches or less.

The smaller, elongate portion 194 of the wave guide channel 130 allows relatively high frequencies (up to at least 6.3 kHz) to develop a standing wave pattern within the channel adjacent the speaker 138. Thus, the test microphones 138 and 160 (FIG. 2) can be tested at such high frequencies without the use of electronic substitutes. The calibrator 110 can also test at the opposite extreme of ISO 1043 standards, 63 Hz. Obviously, the cross-sectional areas could be changed to provide changes in the frequencies which could be tested. However, it is anticipated that the cross-sectional area of the larger portion 190 will be between 0.3 and 1.0 inches, and the cross-sectional area of the smaller portion 194 will be less than 0.2 inches.

In addition to the sizing discussed above, each of the concave junctures between adjoining sidewalls has a radius which minimizes interference. For example, adjacent the second end 122, the corners 200 have a radius of about 0.047 inches, and the corners 204 at the first end 118 have a radius of about 0.125 inches.

Referring now to FIGS. 4A and 4B, there is shown cross-sectional views taken through the wave guide channels 130 and 134 at plane B—B and C—C respectively (FIGS. 2–3). Referring specifically to FIG. 4A, the reference microphones 150 and 172 are mounted in the top sidewall as was discussed previously. No lateral sidewall is provided, as it is at this position that the test microphones, not shown, are inserted into the receptacles 142 and 164 of the respective wave guide channels 130 and 134.

Referring now to FIG. 4B, there is shown a cross-sectional view taken along the plane C—C. FIG. 4B shows the transition between the larger portion 190 and the smaller portion 194 wherein the cross-sectional area of the respective wave guide channels 130 and 134 decrease.

Figure 5:
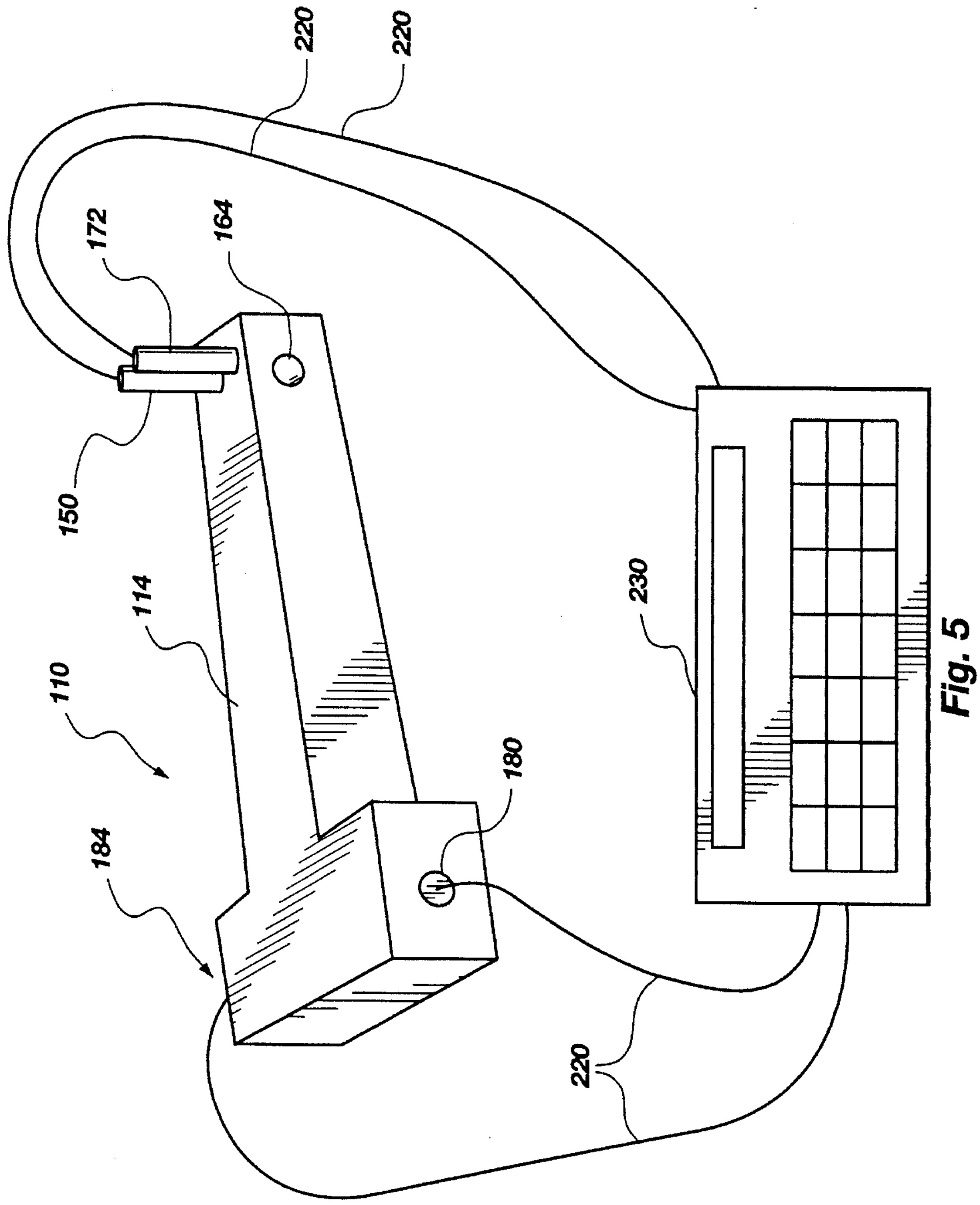
FIG. 5 is a perspective view of an intensity acoustic calibrator made in accordance with the principles of the present invention.

Referring now to FIG. 5, there is shown a perspective view of the calibrator 110. The reference microphones 150 and 172 extend from the top of the housing 114, and the test microphones (not shown) nest in the receptacle 164 on the side of the housing.

Connected to the calibrator 110 by a plurality of wires 220 is a control panel 230. Via the wires 220, the control panel 230 is in communication with the reference microphones 150 and 172, and with the speakers, speaker 180 being shown. The control panel 230 includes circuitry, not shown, which enables the user to arbitrarily control the phase and magnitude of sounds emitted by the speakers 180 and 184 (or by other acoustic transmitters which may be used in place of the speakers). By controlling the phase and magnitude of sounds emitted by the speakers 180 and 184, a user can simulate intensities at selected microphone spacings. Differing magnitude levels, as well as various single sinusoids and pseudo random noise can also be developed by selecting preprogrammed sequences from the control panel 230. Those skilled in the art will be familiar with methods for developing such acoustic conditions by varying the output of the respective speakers.

In addition to the above, the control panel will also have inputs 232 for entering the temperature, static pressure, phase correction, and other variables which are important for microphone calibration, such as spacing settings and magnitude settings for dynamic pressure. The ability to enter such variables is important in that intensity is an acoustic power measurement defined by $$I=PV$$

where P is the dynamic pressure and V is the particle velocity. Because velocity is difficult to measure by direct means, it is typically determined by $$V=\frac{1}{\rho}\int\frac{Pb-Pa}{\Delta r}\,dt$$

where Pa and Pb are pressure measurements made at a relative distance of $\Delta r$, and $\rho$ (rho) is the density of the medium. The density of the medium, of course, is dependent on temperature, static pressure and composition of the medium.

Intensity measurements consist of making two or more pressures at close separations and calculating the value by digital means. Errors result from the inaccuracy of density, spacing and pressure measurements and from the transfer functions of the microphones and instruments. A field calibration needs to simulate the values of Pa and Pb for a given I at known spacing and compensate for changes in the density. Because the medium of the devices at issue is air, pressure and temperature are dominant factors in calculating the density and must be monitored. Additionally, relative humidity can affect the result and can also be measured to adjust for changes in composition. However, below 35 degrees celsius, relative humidity has little effect within the 1043 IEC tolerances.

In use, the operator first places the microphones 138, 150, 160 and 172 into their respective receptacles (see FIG. 2) and the operator enters the values for the variables such as static pressure, temperature, etc. Alternatively, sensors which provide such information may be formed integrally with the control panel 230 so that these variables are automatically adjusted with each use of the device.

The operator then provides a test signal to both of the test microphones 138 and 160 and reference microphones 150 and 172. By monitoring the response of the microphones 138, 150, 160 and 172, the operator can tell if speakers 180 and 184 are emitting the proper signal. If they are not, the speakers 180 and 184 must be adjusted. If the signal received by the reference microphones 150 and 172 is the same as that designated on the control panel 230 to be provided by the speakers 180 and 184, but different than that indicated by the test microphones 138 and 160, then the test microphones must be either replaced or adjusted.

The operator may then run additional tests on the test microphones 138 and 160 by modifying the phase and magnitude of emissions from the speakers 180 and 184 with the control panel 230. As the operator creates phase differentials and magnitude changes to simulate Intensities at selected microphone spacings, various single sinusoids, various intensity levels and pseudo random noise, the reference microphones 150 and 172 communicate with the circuitry in the control panel 230 or to external processors, such as a computer, to ensure that the speakers 180 and 184 are providing the intended magnitude, phase, etc. As will be appreciated, the independent control of each speaker provided by the circuitry of the control panel 230, along with the two wave guide channels 130 and 134 (FIG. 2) enable the test microphones 138 and 160 (not shown in FIG. 5) to be tested independently and through a broad range of frequencies. By acoustically isolating each of the test microphones 138 and 160, numerous conditions may be developed which were not achievable with the calibrating devices of the prior art.

Additionally, the reference microphones 150 and 172 significantly improve the reliability of the results achieved. If the reference microphones 150 and 172 detect magnitude and phase values which are not those selected by the operator, adjustments to the speakers 180 and 184 are automatically made to correct any discrepancy. Thus, the operator is assured that any reading provided by the test microphones 138 and 160 which is different from the specified output of the speakers 180 and 184 indicates error in the test microphones, not the output of the speakers.

Figure 6:
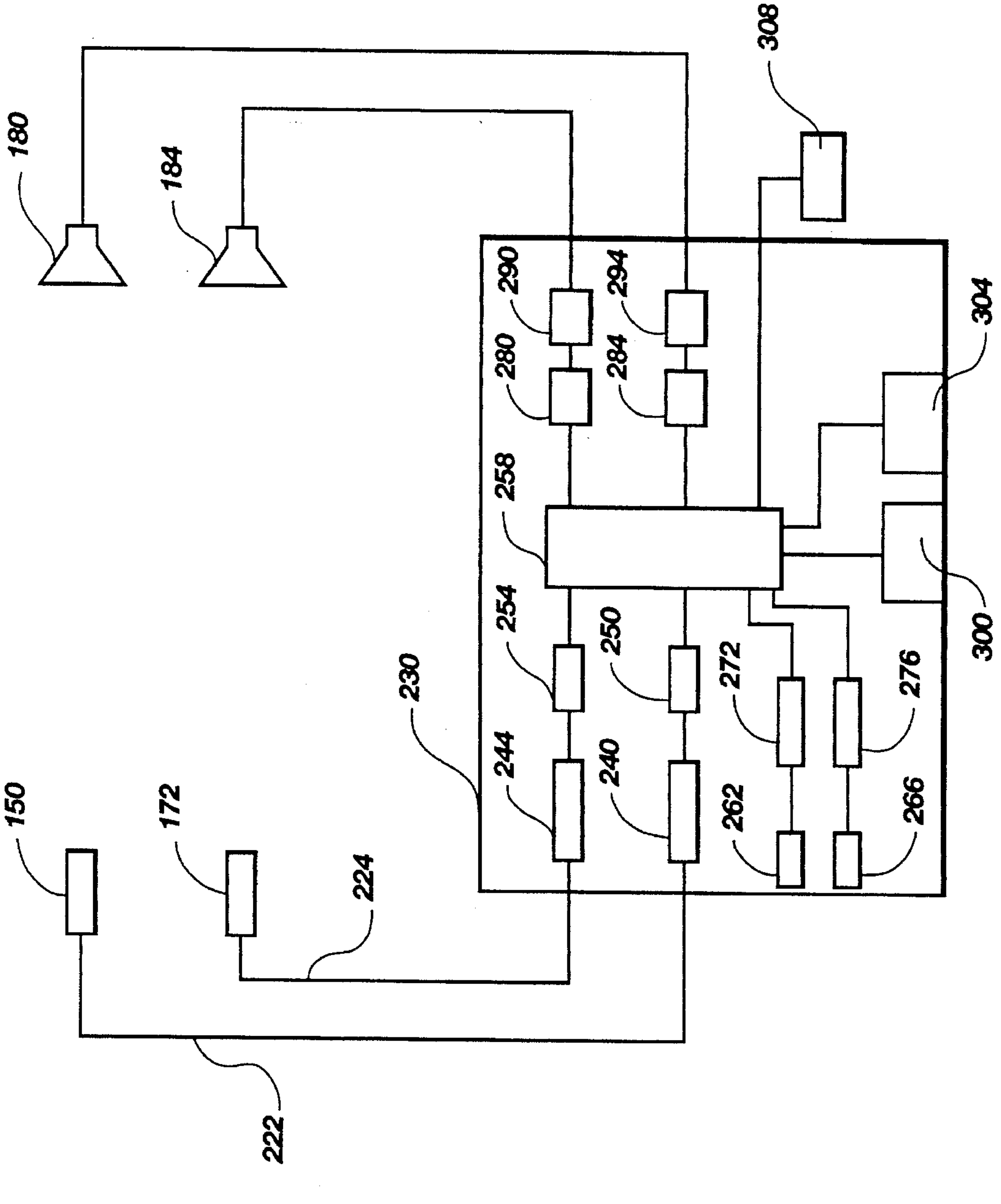
FIG. 6 is schematic view of circuitry which may be used with the present invention.

Referring now to FIG. 6, there is a simplified schematic of the circuitry of the present invention. The reference microphones 150 and 172 are connected by wires 222 and 224 to preamps 240 and 244 within the control panel 230. The preamps 240 and 244 are, in turn, connected to a pair of analog to digital converters 250 and 254 which communicate with a digital signal processor 258. A temperature monitor 262 and a pressure monitor 266 are also connected to respective analog to digital converters, 272 and 276, which communicate with the digital signal processor 258. The digital signal processor 258 communicates with the speakers 180 and 184 via respective pairs of digital to analog converters 280 and 284, and amplifiers 290 and 294.

Information about the reference microphones 150 and 172 and the speakers 180 and 184 is provided to the user via a display 300. A keyboard 304 is provided so that a user may enter the magnitude and phase information for testing the test microphones, not shown. The digital signal processor 258 typically also includes a computer interface 308 so that information about the test may be stored or used to otherwise generate data.

Thus, there is disclosed one embodiment of an intensity acoustic calibrator for testing microphones. The calibrator includes a pair of wave guide channels formed in the housing which allow the creation of numerous different acoustic conditions by allowing the user to arbitrarily select phase differentials and magnitudes at frequencies ranging from 63 Hz up to at least 6.3 kHz which are received by acoustically isolated test microphones. The control panel 230 enables the user both to select the varying sound characteristics, and to use reference microphones to ensure that the speakers are functioning as intended. Those skilled in the art will recognized numerous modifications which could be made to the present invention without departing from the scope and spirit of the invention. For example, the speakers could be replaced by numerous other acoustic transmitters, such as pistons, to generate the magnitudes and phase differentials desired.

Those skilled in the art will also recognize that the present invention is not limited the to the use of air as the medium for wave transmission. While discussed above in reference to air, the wave guide channels could be filled with a liquid medium, such as water. Rather than conventional microphones, hydrophones could be monitored and adjusted to ensure that they were calibrated properly. Likewise, a means for generating a standing wave in the liquid medium of the wave guide channels includes wave generation means other than a speaker.

In addition to the liquid, a similar use could be made with solids. As opposed to the air or liquid medium in the wave guide channels separated by a solid material, use of the principles of the present invention in a solid medium would result in the opposite structure. The wave guide medium would be formed in solid materials in place of the air in wave guides 130 and 134 (FIG. 2), and the solid materials would be separated by a "dividing wall" made of air or some other analogous material. The air dividing wall would serve the same purpose as the solid dividing wall 126 discussed relative to FIG. 2. Namely, the dividing wall isolates the standing wave patterns by separating the wave guides.

In an embodiment in which the wave guide medium is formed of a solid and the dividing wall is formed of air, the measuring devices being calibrated would typically be accelerometers instead of the microphones or hydrophones discussed above. Those skilled in the art will recognize that microphones and hydrophones measure the acoustic energy by monitoring the pressure. In a solid, however, this is difficult to do. Thus, to monitor the acoustic energy, the accelerometer measures acceleration, or vibration, at the surface of the solid.

While in the industry, measurements of microphones and hydrophones are typically referred to as acoustic measurements, and measurements of accelerometers are commonly referred to as vibration measurements, for the purposes of this patent, acoustic transducers or acoustic transducer means include all three types of devices. The use of acoustic transducer is appropriate as all three of these devices measure acoustic energy in their respective ways and the transmission of the energy is subject to the same general laws of physics. Likewise, the means for developing acoustic energy shall be generically referred to as acoustic transmitter means; so as to include the devices discussed above, as well as other equivalent structures.

As will be appreciated by those skilled in the art, the frequency ranges discussed above can be modified by using different mediums. For example, replacing air with helium significantly increases the frequency at which the calibrator will work. Likewise, using a liquid or a solid as the medium allows the respective acoustic transducers to be tested through different ranges.

Those skilled in the art will recognize many other modifications which may be made to the present invention without departing from the scope or spirit of the same. The appended claims are intended to cover such modifications to the present invention.

What is claimed is:

1. An intensity acoustic calibrator for testing microphones, comprising:

housing means having at least first and second wave guide channels formed therein and receiving means formed in the housing means adjacent each wave guide channel for holding at least two test acoustic transducers such that at least one acoustic transducer is in acoustic communication with the first wave guide channel, and isolated from the second wave guide channel, and such that another acoustic transducer is in acoustic communication with the second wave guide channel;

acoustic transmitter means disposed at the housing means for emitting sound so as to develop at least one standing wave pattern within each of the first and second wave guide channels; and control means in communication with said acoustic transmitter means for enabling a user to select magnitude and phase differentials emitted by the acoustic transmitter means into the first and second wave guide channels, respectively.

2. The intensity acoustic calibrator according to claim 1, wherein the housing means includes a dividing wall disposed between each of the wave guide channels so as to acoustically isolate each channel.

3. The intensity acoustic calibrator according to claim 2, wherein the acoustic transmitter means comprises at least two speakers, each speaker being disposed adjacent a respective one of the first and second wave guide channels for developing an independent standing wave pattern in each wave guide channel.

4. The intensity acoustic calibrator according to claim 1, wherein the housing means comprises a first end and a second end, and wherein the acoustic transmitter means is disposed adjacent the first end and wherein the receiving means is disposed adjacent the second end.

5. The intensity acoustic calibrator according to claim 4, wherein each wave guide channel extends from a point adjacent the first end to a point adjacent the second end, and wherein the wave guide channel defines a larger cross-sectional area perpendicular to a long axis of the wave guide channel adjacent the first end than a cross-sectional area adjacent the second end.

6. The intensity acoustic calibrator according to claim 5, wherein said cross-sectional area at the point adjacent the first end is between about 0.3 and 1 square inches.

7. The intensity acoustic calibrator according to claim 5, wherein said cross-sectional area at the point adjacent the second end is less than 0.2 square inches.

8. The intensity acoustic calibrator according to claim 1, wherein the receiving means comprises a plurality of receptacles, at least one receptacle being disposed in the housing means adjacent each wave guide channel for holding a test microphone in acoustic communication with a respective wave guide channel.

9. The intensity acoustic calibrator according to claim 8, wherein the intensity acoustic calibrator further comprises at least one reference acoustic transducer, and wherein the receiving means comprises a receptacle in the housing for holding said reference acoustic transducer in acoustic communication with a respective wave guide channel.

10. The intensity acoustic calibrator according to claim 9, wherein the intensity acoustic calibrator comprises a plurality of reference acoustic transducers, one reference acoustic transducer being disposed adjacent each wave guide channel so as to be in acoustic communication with said wave guide channel.

11. The intensity acoustic calibrator according to claim 10, wherein the receptacles for holding a test acoustic transducer and the receptacles for holding the reference acoustic transducer are disposed adjacent one another in each respective wave guide channel.

12. The intensity acoustic calibrator according to claim 9, wherein the control means comprises means for receiving signals indicative of the magnitude and phase of the standing wave pattern from reference acoustic transducer.

13. The intensity acoustic calibrator according to claim 12, wherein the control means comprises a processor means for receiving signals from the reference acoustic transducer, and for sending signals to the acoustic transmitter means in order to make adjustments to parameters of the standing wave pattern and thereby calibrate the acoustic transducer.

14. The intensity acoustic calibrator according to claim 13, wherein the speaker means comprises a plurality of speakers, at least one speaker being mounted adjacent each respective wave guide channel, and wherein the control means further comprises digital means for controlling each speaker individually so as to enable selective control of magnitude, phase and frequency of sound emitted from each speaker.

15. The intensity acoustic calibrator according to claim 1, wherein the acoustic transducers comprise microphones.

16. The intensity acoustic calibrator according to claim 1, wherein the acoustic transducers comprise hydrophones.

17. A method for calibrating two or more test acoustic transducers in a calibrator, the method comprising:

a) providing a calibrator having at least two wave guide channels acoustically isolated from one another;

b) nesting each test acoustic transducer in the calibrator such that the test acoustic transducer is in acoustic communication with a respective wave guide channel and isolated from other test acoustic transducers;

c) emitting predetermined sound wave patterns into each wave guide channel so as to develop a predetermined standing wave pattern in the wave guide channel;

d) monitoring the standing wave in each wave guide with the acoustic transducer to obtain a reading representing the parameters of each standing wave pattern; and e) calibrating each acoustic transducer in response to the reading received and the predetermined sound wave.

18. The method according to claim 17, wherein step a) further comprises providing a reference acoustic transducer in acoustic communication with each wave guide channel, and wherein step c) comprises, more specifically, emitting predetermined sound waves into each wave guide channel to create a standing wave in the wave guide channel adjacent the reference acoustic transducer and monitoring the standing wave pattern with the reference acoustic transducer to ensure that parameters of the standing wave pattern in the respective wave guide channel correspond to parameters of the predetermined sound waves.

19. The method according to claim 17, wherein step c) comprises emitting predetermined sound waves of different phases and magnitudes into each wave guide channel so as to develop phase and magnitude differentials, and to calibrate each acoustic transducer independently in light of the phase and magnitude differentials.

20. An intensity acoustic calibrator for testing acoustic monitoring equipment, the calibrator comprising:

acoustic transmission means for developing standing wave patterns;

a first wave guide disposed adjacent the acoustic transmission means, the first wave guide having a first wave guide medium such that the acoustic transmission means develops a standing wave pattern in the first wave guide medium;

a second wave guide disposed adjacent the acoustic transmission means, the second wave guide having a second wave guide medium such that the acoustic transmission means develops a standing wave pattern in the second wave guide medium;

a first acoustic transducer disposed adjacent the first wave guide so as to monitor the standing wave pattern developed therein;

a second acoustic transducer disposed adjacent the second wave guide so as to monitor the standing wave pattern developed therein; and control means in communication with said acoustic transmitter means for enabling a user to select magnitude and phase differentials emitted by the acoustic transmitter means into the first and second wave guide mediums, respectively.

21. The intensity acoustic calibrator of claim 20, wherein the first and second wave guide mediums comprise a gas, and wherein the acoustic transducers comprise microphones.

22. The intensity acoustic calibrator of claim 20, wherein the first and second wave guide mediums comprise a liquid, and wherein the acoustic transducers comprise hydrophones.

23. The intensity acoustic calibrator of claim 20, wherein the first and second wave guide mediums comprise a solid, and wherein the acoustic transducers comprise accelerometers.

24. The intensity acoustic calibrator of claim 20, wherein the calibrator further comprises dividing means for acoustically isolating the first wave guide and the second wave guide.

25. The intensity acoustic calibrator of claim 24, wherein the dividing means comprises a solid material.

26. The intensity acoustic calibrator of claim 24, wherein the dividing means comprises air.

27. The intensity acoustic calibrator according to claim 20, wherein the intensity acoustic calibrator comprises a plurality of reference acoustic transducers, one reference acoustic transducer being disposed adjacent each wave guide so as to be in acoustic communication with said wave guide.

* * * * *